Nov. 10, 1953     H. T. COTTRELL     2,658,772
JOINT FOR STEERING PARTS ON AUTOMOBILES HAVING
INDEPENDENT FRONT WHEEL SUSPENSION
Filed Aug. 25, 1951     2 Sheets-Sheet 1
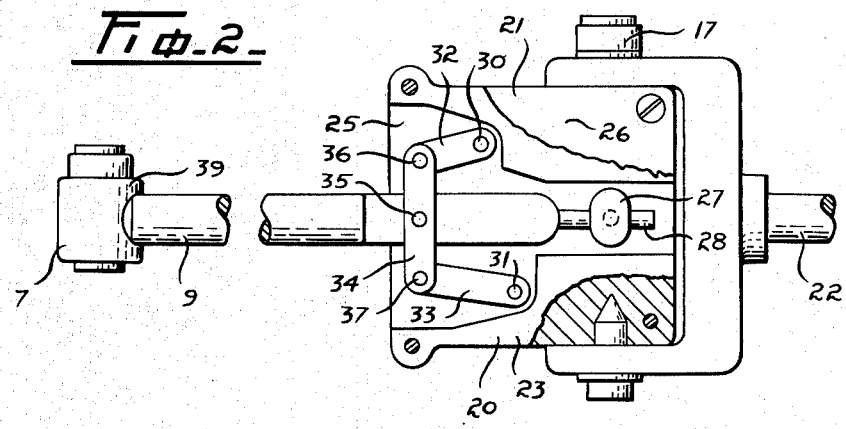
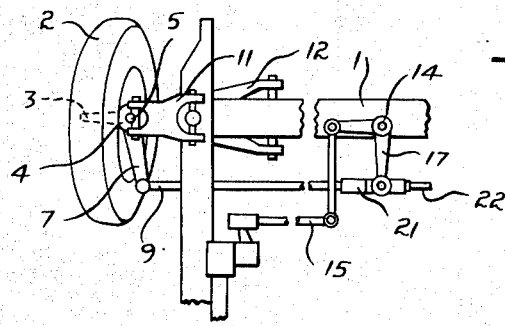
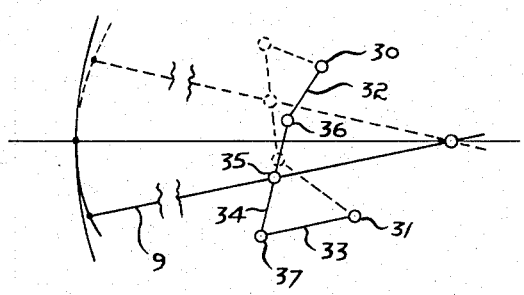
INVENTOR
HERBERT T. COTTRELL
Ernest E. Carver
ATTORNEY Nov. 10, 1953 H. T. COTTRELL 2,658,772
JOINT FOR STEERING PARTS ON AUTOMOBILES HAVING
INDEPENDENT FRONT WHEEL SUSPENSION
Filed Aug. 25, 1951 2 Sheets-Sheet 2

INVENTOR
HERBERT T. COTTRELL
Ernest L Carver
ATTORNEY

Patented Nov. 10, 1953

2,658,772

UNITED STATES PATENT OFFICE 2,658,772

JOINT FOR STEERING PARTS ON AUTOMOBILES HAVING INDEPENDENT FRONT WHEEL SUSPENSION

Herbert T. Cottrell, Vancouver, British Columbia, Canada

Application August 25, 1951, Serial No. 243,605

4 Claims. (Cl. 280—95)

My invention relates to improvements in joints for steering parts on automobiles having independent front wheel suspension where the king pin of each wheel is mounted to move in a vertical plane in response to loading and road shocks, with the upper end of said pin oscillating about an arc of one radius and the lower end of said pin oscillating about an arc of another radius. Each wheel is adapted to be moved by the steering wheel about a vertical axis by means of a steering rod connected at one end to the conventional steering column member and connected at the other end to an arm integral with the wheel spindle and king pin bearing, which arm is subject to up and down movement relative to the front cross frame member of the vehicle. The steering rod normally employed is fitted with one or more ball joints, so that its outer end can describe any arc resulting from up or down movement of the wheel and consequently since this steering rod is normally mounted, when the plane of the wheel is parallel to the longitudinal axis of the vehicle frame, in a plane parallel to but remote from the axis of the front cross frame member the outer or wheel end of the steering rod will move inwardly as the wheel rises above its normal horizontal plane and also as it drops below said plane. This above mentioned inward movement obviously swings the wheel horizontally about the king pin and in some cases the wheel movement in said horizontal plane will be different per given unit of lift above the wheel's normal horizontal plane than its movement below said normal plane. In other cases the swing of the wheel about the king pin may be of the same magnitude for movement above and below the normal horizontal plane. In any case, by the use of steering rods and fittings as now conventionally used between the steering gear and the wheel spindle the wheel must turn somewhat about that portion of its tread which is in contact with the ground when said wheel is either moving up or down with respect to its normal horizontal position relative to the cross frame member.

The objects of the invention are to provide a steering fitting adapted to be applied to or adjacent one end of the steering rod of each independently sprung front wheel of a vehicle and connected to the outer end of the steering arm of a front wheel spindle which will compensate for the decrease in distance between the connected parts, so that the wheel will not turn about a vertical axis when it moves up or down with respect to the cross member of the chassis unless urged to do so by movement of the steering wheel.

Referring to the drawings:

Figure 1 is a plan view of one front wheel suspension with a steering rod connecting a spacer rod with the steering arm of a wheel spindle bearing, indicating the desired position of the invention.

Figure 2 is a longitudinal sectional view of the joint adapted for use in overcoming swinging movement of the wheel and its spindle when dropping below the normal horizontal position of the wheel relative to the front cross frame member and also for overcoming such movement when rising above the normal horizontal position.

Figure 3 is a diagrammatic view of the positions assumed by the parts of the joint when the spindle is below normal position and as indicated in dotted line as when the spindle is above normal position.

In the drawings like characters of reference indicate coresponding parts in each figure.

Figure 4:
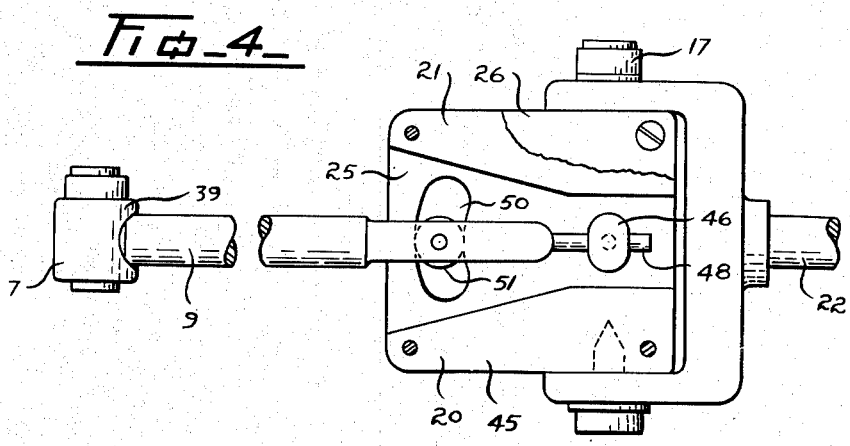
Figure 4 is a longitudinal sectional view of a modification of the joint which is designed to give exactly the same movement as the preferred emobdiment shown in Figures 1, 2 and 3.

The joint as here shown is adapted to perform the same functions as that shown in my copending application filed January 15, 1951, Serial Number 206,082, now Patent No. 2,628,109, and to provide that the curve described by the joint above the normal position shall merge without describing any angle of intersection with the curve described below the said normal position. The term "normal position" herein referred to indicates the position of the front wheel spindle below the front cross frame member when the car is at rest and the vehicle is without load. The term "centre point" is intended to indicate the height along the king pin which is level with the free end of the arm on the wheel spindle bearing and the term "centre arc" is intended to indicate the arc along which the centre point moves in a vertical plane as the wheel and its spindle move above or below the centre point incidental to road bumps or road depressions.

Referring to the drawings, the numeral 1 indicates the cross frame member of a vehicle chassis at the ends of which front wheels 2 (one only shown) are connected. Each front wheel is fitted upon a spindle 3 of a spindle bearing 4 and the spindle bearing is journalled about a substantially vertical king pin 5. Extending rearwardly of the spindle bearing 4 is a steering arm 7 to which a steering rod 9 is adapted to be connected. The king pin 5 is hingedly connected at its upper and lower end to the cross frame member 1 by wish bone plates or links 11 and 12 respectively, and the links are hingedly connected to the frame member in the usual manner. As in the conventional wheel mounting the length of the upper link is shorter than the length of the lower link 12, so that as said links swing in a vertical plane due to wheel lift or drop, their free ends and the ends of the king pin describe arcs of different radii as A and B respectively, see Figures 6 and 7.

Mounted upon the cross frame member 1 is a bell crank 14 which is moved by an appropriate operating train 15 from the steering column. The bell crank 14 is provided with an arm 17 by which it is connected to the fork 20 of a swinging joint 21, the fork 20 in turn being connected to a steering rod 9 and a spacer rod 22. If the bell crank is to one side of the horizontal centre of the cross frame member the spacer rod will obviously be necessary, but if its arm 17, when extending normal to the length of the cross member, is at the centre of said cross member another swinging joint 21 and steering rod 9 would extend from the bell crank to the steering arm 7 of the right wheel of the vehicle.

The swinging joint 21 which is the basis of the invention consists of a vertically disposed plate 23 having a V-shaped recess 25. The plate 23 is adapted to be enclosed by a cover 26. In the base of the recess 25 a rockingly mounted fork 27 is mounted in which a stem 28, forming an inner end part of the steering rod 9, is slidably mounted. Towards the mouth of the recess 25 pins 30 and 31 are fitted and rockingly mounted on these pins are swinging links 32 and 33 respectively. The upper link 32 is short and the lower link is relatively long and when the steering rod is in normal position the link 32 will be pointing angularly downwards and the lower link will be pointing angularly upwards at their outer ends. A toggle bar 34 is rockingly mounted intermediate its length, as at 35, upon the steering rod 9 and is pivotally connected at its ends to the outer ends of the links 32 and 33 as at 36 and 37, so that the universal joint 39 at the outer end of the steering rod 9 drops below the normal horizontal position as shown in Figure 2, the rod 9 will move inwardly and the links 32 and 33 and the toggle bar 34 will assume the positions shown in solid line in Figure 3. The curve described by the outer end of the steering rod 9 will be of shorter radii than when said rod moves upwardly and the disposition of parts will be as indicated in dotted line. The curves described above and below the normal line merge absolutely into each other and do not form an intersecting angle in changing from a lower curve to an upper, or vice versa, for the reason that when the outer end of say link 32 passes the horizontal centre and its pin 36 changes from outwards to an inward direction the outer end of the link 33 will still be swinging below centre and its pin 37 will still be moving slightly in an outward direction, or vice versa, so that there is a moment when the pin 35 must be moving vertically across the plate.

Since the radius of swing of the steering rod is greater than the radius of vertical swing of the centre of the king pin, it will be obvious that for a given rise or fall of the outer end of said rod and that of the king pin that the steering spindle will be caused to turn about the king pin and that the king pin will move in towards the longitudinal axis of the vehicle as the wheel lifts above or when it drops below its normal position. Likewise in some cases, depending on the setting of the fulcrum points of the wheel suspension and that of the king pin, the inward movement of both king pin and rod end may be the same or one inward movement only may differ. In view of the above by providing means such as that here described for appropriately shortening the length between the universal joint and the pin on which the joint 21 swings during the time that the steering arm is moving up and down, or down only as the case may be, the steering arm can be made to travel inwards parallel to itself without turning about its vertical axis.

Figure 5:
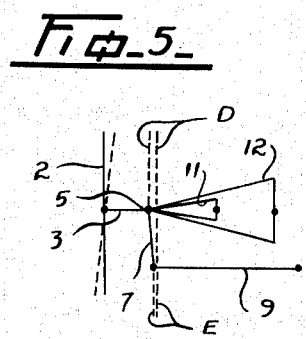
Figures 5, 6 and 7 are respectively diagrammatic plan view, elevational view and perspective view of the movements of the several parts of a conventional wheel suspension and the effect of the swinging joint upon said members.
Figure 6:
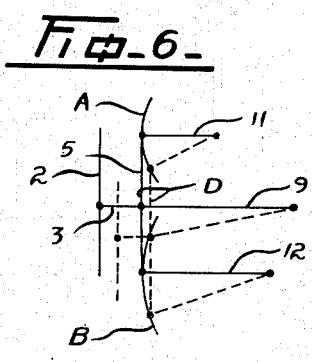

In Figure 5 and Figure 6 the steering arm 7 is shown as being substantially parallel to the longitudinal axis of the vehicle, the distance between the normal line position of the king pin and its position when lowered relative to said line is as between the dotted lines D, whereas the inward travel of the parts in a conventional assembly swinging in the same length as the king pin centre would be only equal to that indicated between the dotted lines E, but when the presently described joint is incorporated into the steering rod and the fulcrum of rod is changed as shown in Figure 3, the distance E is increased to equal the distance D.

Figure 7:
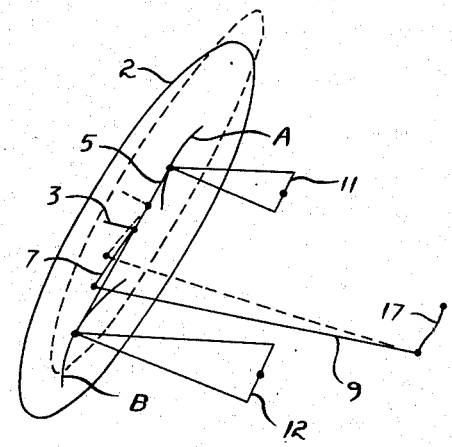

Referring to Figure 7, the steering rod and wheel suspension parts of the conventional structure is shown in solid line, the steering rod being disposed in normal position, the dotted lines indicate the position of the steering rod, steering arm, wheel spindle and wheel when raised above said normal position. In Figure 7 it will be clearly seen that the plane of the wheel changes from straight position parallel to the longitudinal axis of the frame to a "toe in" position as the wheel lifts, in spite of the fact that the bell crank arm, through which steering is effected, has not been moved.

Referring to Figure 4, the joint 21 is designed to do exactly the same work as the preferred embodiment of the invention and consists of a plate 45 having a rockingly mounted boss 46 through which a stem 48 on the inner end of the steering rod 9 is slidably mounted. A cam slot 50 is formed in the plate, the centre line of which conforms to arcs traversed by the centre of the pin 35 of the joint as shown in Figure 2 and fitted in the slot 50 is a roller 51 which is rotatably mounted on a side of the rod 9, so that when the steering rod 3 drops below the normal position its outer end will describe the curve shown in solid line in Figure 3 and when the rod swings above the normal horizontal line as indicated by the dotted line in Figure 3, the curve described will be as shown in the upper part of the figure.

It will be obvious that the joint herein described could be used on any rod where a slight shortening or lengthening should desirably be provided for.

What I claim as my invention is:

1. A pair of steering rods for a vehicle having independent front wheel suspension, said steering rods being adapted for connection between a manually operated arm of the vehicle steering mechanism and the steering arms of the front spindle bearings, each of said rods having a part connecting joint at each end, one of said joints comprising a vertical plate having a passageway in which the inner end of one of said steering rods may have oscillating and endwise movement, a pair of links having inner and outer ends pivotally connected at their inner ends to the plate above and below the passageway, and a toggle rockingly mounted upon the rod, said toggle being pivotally connected at its outer ends to the outer ends of the links.

2. A pair of steering rods for a vehicle having independent front wheel suspension, said steering rods being adapted for connection between a manually operated arm of the vehicle steering mechanism and the steering arms of the front spindle bearings, each of said rods having a part connecting joint at each end, one of said joints comprising a vertical plate having a passageway in which the inner end of one of said steering rods may have oscillating and endwise movement, a pair of links having inner and outer ends pivotally connected at their inner ends to the plate above and below the passageway, a toggle rockingly mounted upon the rod, said toggle being pivotally connected at its outer ends to the outer ends of the links, said links being of different length.

3. A pair of steering rods for a vehicle having independent front wheel suspension, said steering rods being adapted for connection between a manually operated arm of the vehicle steering mechanism and the steering arms of the front spindle bearings, each of said rods having a part connecting joint at each end, one of said joints comprising a vertical plate having a passageway in which the inner end of one of said steering rods may have oscillating and endwise movement, a pair of links having inner and outer ends pivotally connected at their inner ends to the plate above and below the passageway, a toggle rockingly mounted upon the rod, said toggle being pivotally connected at its outer ends to the outer ends of the links, said links being of different length, the link above the passageway being shorter than the link below said passageway.

4. A pair of steering rods for a vehicle having independent front wheel suspension, said steering rods being adapted for connection between a manually operated arm of the vehicle steering mechanism and the steering arms of the front spindle bearings, each of said rods having a part connecting joint at each end, one of said joints comprising a vertical plate having a passageway in which the inner end of one of said steering rods may have oscillating and endwise movement, a pair of links having inner and outer ends pivotally connected at their inner ends to the plate above and below the passageway and a toggle rockingly mounted upon the rod, said toggle being pivotally connected at its outer ends to the inner ends of the links, said links being mounted to converge towards their outer ends.

HERBERT T. COTTRELL.

References Cited in the file of this patent

UNITED STATES PATENTS

| Number | Name | Date |
|---|---|---|
| 2,173,667 | Slack | Sept. 19, 1939 |
| 2,246,661 | Best | June 24, 1941 |
| 2,334,702 | Newton et al. | Nov. 23, 1943 |